(12) United States Patent
Nakamoto et al.

(10) Patent No.: US 9,365,423 B2
(45) Date of Patent: Jun. 14, 2016

(54) METHOD AND DEVICE FOR SEPARATING HYDROGEN SULFIDE AND HYDROGEN PRODUCTION SYSTEM USING THE SAME

(71) Applicant: KAWASAKI JUKOGYO KABUSHIKI KAISHA, Kobe-shi, Hyogo (JP)

(72) Inventors: Takashi Nakamoto, Kakogawa (JP); Toshinori Muraoka, Kobe (JP); Shigenobu Okajima, Tokyo (JP); Norihiko Kumada, Kobe (JP); Masatoshi Hirokawa, Kobe (JP); Takatoshi Shoji, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 89 days.

(21) Appl. No.: 14/363,423

(22) PCT Filed: Oct. 29, 2012

(86) PCT No.: PCT/JP2012/006928
§ 371 (c)(1),
(2) Date: Jun. 6, 2014

(87) PCT Pub. No.: WO2013/084402
PCT Pub. Date: Jun. 13, 2013

(65) Prior Publication Data
US 2014/0360368 A1    Dec. 11, 2014

(30) Foreign Application Priority Data
Dec. 8, 2011  (JP) .................. 2011-268825

(51) Int. Cl.
*B01D 53/04* (2006.01)
*C01B 3/56* (2006.01)
(Continued)

(52) U.S. Cl.
CPC ............... *C01B 3/508* (2013.01); *B01D 53/02* (2013.01); *B01D 53/0462* (2013.01);
(Continued)

(58) Field of Classification Search
CPC .... B01D 53/02; B01D 53/04; B01D 53/0462; B01D 53/52; B01D 53/82; B01D 2252/20431; B01D 2253/20; B01D 2253/25; B01D 2256/16; B01D 2257/304; B01D 2257/504; B01J 2219/00; Y02C 10/06; C01B 3/508; C01B 3/56; C01B 31/20; C01B 17/167; C01B 2203/043; C01B 2203/0475; C01B 2203/0485; C01B 2203/146; C01B 2203/147
USPC .............. 96/121, 126, 131, 132, 153; 95/136, 95/139; 423/230
See application file for complete search history.

(56) References Cited

U.S. PATENT DOCUMENTS 2,818,323 A * 12/1957 Haensel ................. B01D 53/12
252/190

(Continued)

FOREIGN PATENT DOCUMENTS

CN    101024139 A    8/2007
CN    101628197 A    1/2010
(Continued)

OTHER PUBLICATIONS

May 19, 2015 Office Action issued in Chinese Application No. 201280058498.6.
(Continued)

*Primary Examiner* — Frank Lawrence
(74) *Attorney, Agent, or Firm* — Oliff PLC (57) ABSTRACT

The system includes adsorbent-packed towers 11 and 21 filled with $H_2S$ adsorbent which triethanolamine is supported by activated carbon. Mixed gas derived from a synthesis gas containing $CO_2$ and $H_2S$ at about 40° C. is supplied to the adsorbent-packed towers 11 and 21 through a line. Valves 12 and 13 are opened, valves 22 and 23 are closed, valves 14 and 15 are closed, and valves 24 and 25 are opened to perform adsorption of $H_2S$ contained in the gas to be treated in the adsorbent-packed tower 11 in a dry state and to perform desorption of $H_2S$ in the adsorbent-packed tower 21. When adsorption of $H_2S$ contained in the gas to be treated is performed in the adsorbent-packed tower 21 and desorption of $H_2S$ is performed in the adsorbent-packed tower 11, the valves 12, 13, 24, and 25 are closed and the valves 22, 23, 14, and 15 are opened.

20 Claims, 4 Drawing Sheets (51) Int. Cl.
*C01B 3/50* (2006.01)
*B01D 53/02* (2006.01)
*B01D 53/52* (2006.01)
*B01D 53/82* (2006.01)
*C01B 31/20* (2006.01)
*C01B 17/16* (2006.01)

(52) U.S. Cl.
CPC ............... *B01D 53/52* (2013.01); *B01D 53/82* (2013.01); *C01B 3/56* (2013.01); *C01B 17/167* (2013.01); *C01B 31/20* (2013.01); *B01D 2252/20431* (2013.01); *B01D 2253/20* (2013.01); *B01D 2253/25* (2013.01); *B01D 2256/16* (2013.01); *B01D 2257/304* (2013.01); *B01D 2257/504* (2013.01); *B01J 2219/00* (2013.01); *C01B 2203/043* (2013.01); *C01B 2203/0475* (2013.01); *C01B 2203/0485* (2013.01); *C01B 2203/146* (2013.01); *C01B 2203/147* (2013.01); *Y02C 10/06* (2013.01)

(56) References Cited

U.S. PATENT DOCUMENTS

| | | | | |
|---|---|---|---|---|
| 3,594,983 A * | 7/1971 | Yearout | ................ | B01D 53/047 95/122 |
| 5,609,840 A | 3/1997 | Mimura et al. | | |
| 5,750,083 A | 5/1998 | Mimura et al. | | |
| 5,876,488 A * | 3/1999 | Birbara | .............. | B01D 53/1475 422/178 |
| 6,355,094 B1 | 3/2002 | Schomaker et al. | | |
| 7,288,136 B1 * | 10/2007 | Gray | .................. | B01D 53/1475 423/228 |
| 7,767,004 B2 * | 8/2010 | Sayari | .................... | B01D 53/02 264/48 |
| 2010/0011955 A1 | 1/2010 | Hufton et al. | | |

FOREIGN PATENT DOCUMENTS

| | | |
|---|---|---|
| EP | 0 322 924 A1 | 7/1989 |
| JP | A-64-56114 | 3/1989 |
| JP | A-1-304026 | 12/1989 |
| JP | A-7-256096 | 10/1995 |
| JP | A-7-258664 | 10/1995 |
| JP | B2-2966719 | 10/1999 |
| JP | 2004-284875 A | 10/2004 |
| JP | 2004-292240 A | 10/2004 |
| JP | A-2009-22874 | 2/2009 |
| WO | WO 01/28916 A1 | 4/2001 |
| WO | WO 2011/108212 A1 | 9/2011 |

OTHER PUBLICATIONS

International Search Report issued in International Patent Application No. PCT/JP2012/006928 dated Feb. 12, 2013.

* cited by examiner

METHOD AND DEVICE FOR SEPARATING HYDROGEN SULFIDE AND HYDROGEN PRODUCTION SYSTEM USING THE SAME

TECHNICAL FIELD

The present invention relates to a method and device for separating hydrogen sulfide and a hydrogen production system using the same. More specifically, the present invention relates to a method and device for separating hydrogen sulfide, which are capable of selectively separating hydrogen sulfide from a gas to be treated containing hydrogen sulfide and carbon dioxide, and a hydrogen production system using such a hydrogen sulfide separation device.

BACKGROUND ART

In a hydrogen production system that produces hydrogen with a high purity of 99.9% or more, synthesis gas is produced by partial combustion of a raw material such as coal in a high-temperature gas furnace, and hydrogen is separated from the synthesis gas. The synthesis gas contains, in addition to hydrogen ($H_2$) as a main component, carbon monoxide (CO), carbon dioxide ($CO_2$), and water ($H_2O$), hydrogen sulfide ($H_2S$). In a process intended to merely produce hydrogen, hydrogen sulfide is separated together with carbon dioxide that is an acidic gas by a chemical absorption method (e.g., an absorption method using an amine) or a physical absorption method (e.g., an absorption method using a polymer solution).

Recently, there has been a growing need for CCS (Carbon dioxide Capture and Storage) or EOR (Enhanced Oil Recovery), but it has been pointed out that there is a problem that hydrogen sulfide contained in separated carbon dioxide corrodes a piping. In order to avoid this problem, separation of hydrogen sulfide is required to reduce the concentration of hydrogen sulfide in carbon dioxide to a low level of, for example, 10 ppm or less.

In order to separate hydrogen sulfide contained in carbon dioxide, a technique has been developed in which hydrogen sulfide is selectively separated using an aqueous triethanolamine solution (Patent Document 1). However, in this technique, most of supplied carbon dioxide is absorbed by the aqueous triethanolamine solution together with hydrogen sulfide. Therefore, this technique is unsatisfactory in that the amount of carbon dioxide recovered is reduced and the amount of heat for separating hydrogen sulfide is increased.

Further, another technique has also been developed in which hydrogen sulfide is selectively separated using an aqueous solution of a sterically-hindered amine (Patent Document 2). This technique is an invention intended to improve a reduction in the amount of hydrogen sulfide absorbed due to a large difference in concentration between carbon dioxide and hydrogen sulfide. Patent Document 2 states that hydrogen sulfide can be selectively absorbed by this technique. However, also in this technique, the fact remains that carbon dioxide is absorbed together with hydrogen sulfide at the same time. Therefore, this technique is unsatisfactory in that hydrogen sulfide is mixed into recovered carbon dioxide, the amount of heat for separating hydrogen sulfide is increased, and the amount of carbon dioxide recovered is reduced.

Further, an attempt has been made to remove hydrogen sulfide by bringing biogas containing carbon dioxide and hydrogen sulfide into contact with zeolite having moisture previously adsorbed thereto as a catalytic reaction suppressing agent (Patent Document 3). However, in this technique, the amount of water contained in zeolite needs to be maintained at 0.2 to 3.3 wt % and desorption of hydrogen sulfide needs to be performed under conditions of a high temperature of 200° C. or more. Therefore, this technique still has problems such as difficulty in control of moisture and large consumption of regenerated energy.

CITATION LIST

Patent Literature

PTL 1: Japanese Laid-Open Patent Application Publication No. 1-304026 (claim 1)
PTL 2: Japanese Patent No. 2966719 (claim 1)
PTL 3: Japanese Laid-Open Patent Application Publication No. 2009-22874 (claims 1 and 2)

SUMMARY OF INVENTION

Technical Problem

There is a very large difference in concentration between carbon dioxide and hydrogen sulfide contained in synthesis gas, because the concentration of carbon dioxide is as high as 30% or more, whereas the concentration of hydrogen sulfide is as low as 1000 ppm or less. It is difficult for a conventional method (e.g., a chemical absorption method used under relatively low pressure conditions or a physical absorption method used under relatively high pressure conditions) to selectively absorb and separate a low concentration of hydrogen sulfide, because carbon dioxide and hydrogen sulfide are absorbed in proportion to a difference in concentration (partial pressure) between them. Further, in the case of a physical absorption method using a polymer solution, hydrogen sulfide can be highly efficiently separated by, for example, multistage absorption in which hydrogen sulfide is removed in stages by changing pressure, but the amount of energy required for separation is larger than that required for single separation of carbon dioxide. Further, reducing the concentration of hydrogen sulfide in recovered carbon dioxide to its permissible limit or less is virtually impossible even by multistage absorption.

In order to solve the problems of the above-described conventional techniques developed for hydrogen sulfide separation devices and hydrogen production systems, it is an object of the present invention to provide a method and device for separating hydrogen sulfide, which are capable of selectively separating only hydrogen sulfide from a gas to be treated containing carbon dioxide and hydrogen sulfide. It is also an object of the present invention to provide a hydrogen production system using such a method and device for separating hydrogen sulfide.

Solution to Problem

The present invention is directed to a method for separating hydrogen sulfide comprising:
an adsorption step in which a gas to be treated containing hydrogen sulfide and carbon dioxide is brought into contact with a hydrogen sulfide adsorbent, in which an amine compound is supported by a porous material, to selectively adsorb hydrogen sulfide; and
a desorption step in which the hydrogen sulfide adsorbent after adsorption is heated to desorb hydrogen sulfide,
wherein the amine compound is a tertiary amine, and the contact between the hydrogen sulfide adsorbent and the gas to be treated in the adsorption step is made in a dry state so that only hydrogen sulfide is selectively separated.

It is considered that, in the presence of water, carbon dioxide forms an alkyl ammonium ion with the tertiary amine supported by the porous material of the hydrogen sulfide adsorbent as shown below when adsorbed to the hydrogen sulfide adsorbent.

$$R_3N + H_2O + CO_2 \rightarrow R_3HN^+ \cdot HCO_3^- \qquad (1)$$

On the other hand, it is considered that, regardless of the presence or absence of water, hydrogen sulfide forms an alkyl ammonium ion with the tertiary amine supported by the porous material of the hydrogen sulfide adsorbent as shown below.

$$R_3N + H_2S \rightarrow R_3HN^+ \cdot HS^- \qquad (2)$$

In the above formulas (1) and (2), R represents a substituent group.

In the present invention, the contact between the hydrogen sulfide adsorbent and the gas to be treated is made in a dry state, and therefore it is considered that the reaction represented by the above formula (1) does not occur and only hydrogen sulfide is selectively adsorbed to the hydrogen sulfide adsorbent by the reaction represented by the above formula (2). Although the reason why the tertiary amine has particularly high selectivity for hydrogen sulfide is not clear, it is considered that it is difficult for a hydrogen ion to approach a nitrogen atom due to the large steric hindrance of three substituent groups of the tertiary amine, and therefore even when a very small amount of moisture such as water adsorbed to the surface of the porous material is present, the reaction represented by the formula (1) is sufficiently suppressed.

The tertiary amine used in the present invention is preferably a tertiary alkanolamine. This is because the tertiary alkanolamine has a low vapor pressure and is therefore substantially odorless, and is soluble in water and is therefore easy to handle when supported by the porous material.

The present invention is also directed to a device for selectively separating hydrogen sulfide from a gas to be treated containing hydrogen sulfide and carbon dioxide using a hydrogen sulfide adsorbent in which an amine compound is supported by a porous material (device embodiment 1), the device comprising:

an adsorbent-packed tower filled with the hydrogen sulfide adsorbent;

means for supplying the gas to be treated to the adsorbent-packed tower to bring the hydrogen sulfide adsorbent and the gas to be treated into contact with each other; and means for supplying a heated gas flow for desorbing hydrogen sulfide from the hydrogen sulfide adsorbent after adsorption of hydrogen sulfide to the adsorbent-packed tower, wherein the amine compound is a tertiary amine, and the contact between the hydrogen sulfide adsorbent and the gas to be treated in the adsorbent-packed tower is made in a dry state.

It is considered that also in the hydrogen sulfide separation device according of the present invention, the reaction represented by the above formula (1) is suppressed, and therefore only hydrogen sulfide is selectively adsorbed to the hydrogen sulfide adsorbent by the reaction represented by the above formula (2).

Another embodiment of the hydrogen sulfide separation device according to the present invention is a device for selectively separating hydrogen sulfide from a gas to be treated containing hydrogen sulfide and carbon dioxide using a hydrogen sulfide adsorbent in which an amine compound is supported by a porous material (device embodiment 2), the device comprising:

a plurality of adsorbent-packed towers filled with the hydrogen sulfide adsorbent;

a plurality of means for supplying the gas to be treated to the adsorbent-packed towers, respectively, to bring the hydrogen sulfide adsorbent and the gas to be treated into contact with each other; and a plurality of means for supplying a heated gas flow for desorbing hydrogen sulfide from the hydrogen sulfide adsorbent after adsorption of hydrogen sulfide to the adsorbent-packed towers, respectively, wherein the amine compound is a tertiary amine, and the contact between the hydrogen sulfide adsorbent and the gas to be treated in each of the adsorbent-packed towers is made in a dry state, and wherein the gas to be treated is supplied from the gas supplying means to one or more of the adsorbent-packed towers, respectively, to selectively adsorb hydrogen sulfide and the heated gas flow is supplied from the heated gas flow supplying means to another of the adsorbent-packed towers or one or more of the other adsorbent-packed towers, respectively, to desorb hydrogen sulfide.

In this hydrogen sulfide separation device, the adsorbent-packed tower(s) that selectively adsorbs (adsorb) hydrogen sulfide and the adsorbent-packed tower(s) that desorbs (desorb) hydrogen sulfide can be operated at the same time, which makes it possible to perform continuous separation of hydrogen sulfide.

In either of the above-described hydrogen sulfide separation devices, the tertiary amine is preferably a tertiary alkanolamine for the reason that the tertiary alkanolamine is easy to handle.

The present invention is also directed to a system for producing hydrogen from a raw material gas that is a gas to be treated containing hydrogen sulfide, carbon dioxide, and hydrogen, the system comprising:

the hydrogen sulfide separation device according to any one of device embodiment 1 or device embodiment 2 that selectively separates hydrogen sulfide from the raw material gas;

a carbon dioxide separation device that is provided downstream of the hydrogen sulfide separation device to separate carbon dioxide from a gas obtained by removing hydrogen sulfide from the raw material gas; and a hydrogen purification device that is provided downstream of the carbon dioxide separation device to separate hydrogen from a gas obtained by removing hydrogen sulfide and carbon dioxide from the raw material gas.

This hydrogen production system uses the above-described hydrogen sulfide separation device, and therefore, even when the raw material gas contains a high concentration of carbon dioxide, hydrogen sulfide can be selectively separated from the raw material gas.

In the above-described hydrogen production system, the hydrogen sulfide separation device and the carbon dioxide separation device are preferably provided on a high-pressure gas treatment line. This is because, in this case, adsorption of hydrogen sulfide is performed at high pressure, and therefore the amount of hydrogen sulfide recovered per unit weight of the hydrogen sulfide adsorbent is larger than that when adsorption of hydrogen sulfide is performed at ordinary pressure, which makes it possible to reduce the amount of the hydrogen sulfide adsorbent.

Another embodiment of the hydrogen production system according to the present invention is a system for producing hydrogen from a raw material gas that is a gas to be treated containing hydrogen sulfide, carbon dioxide, and hydrogen, the system comprising:

a carbon dioxide separation device that separates hydrogen sulfide and carbon dioxide from the raw material gas;

a hydrogen purification device that is provided downstream of the carbon dioxide separation device to separate hydrogen from a gas obtained by removing hydrogen sulfide and carbon dioxide from the raw material gas; and the hydrogen sulfide separation device according to any one of device embodiment 1 or device embodiment 2 that is provided downstream of the carbon dioxide separation device to selectively separate hydrogen sulfide from a gas containing hydrogen sulfide and carbon dioxide separated by the carbon dioxide separation device.

In the present invention, first, hydrogen sulfide and carbon dioxide are separated from the raw material gas, and hydrogen is further separated from a gas obtained by separating hydrogen sulfide and carbon dioxide from the raw material gas, and hydrogen sulfide is selectively separated from a gas containing hydrogen sulfide and carbon dioxide. This hydrogen production system also uses the above-described hydrogen sulfide separation device, and therefore hydrogen sulfide can be separated from a mixed waste gas containing a high concentration of carbon dioxide.

In the above-described hydrogen production system, it is preferred that the carbon dioxide separation device is provided on a high-pressure gas treatment line and the hydrogen sulfide separation device is provided on an ordinary-pressure gas treatment line. This is because, in this case, the hydrogen sulfide separation device separates hydrogen sulfide at ordinary temperature and ordinary pressure and therefore does not need to be designed to withstand high pressure, which makes it possible to achieve a reduction in the cost and size of the system.

In the above-described hydrogen production system, the carbon dioxide separation device may be one that separates carbon dioxide using a carbon dioxide adsorbent in which an amine compound is supported by a porous material.

Further, the hydrogen production system may be configured to use combustible off-gas after separation of hydrogen by the hydrogen purification device to generate a heated gas flow for desorbing hydrogen sulfide from the hydrogen sulfide adsorbent in the hydrogen sulfide separation device.

Further, the hydrogen production system may be configured to use combustible off-gas after separation of hydrogen by the hydrogen purification device to generate a heated gas flow for desorbing carbon dioxide from the carbon dioxide adsorbent in the carbon dioxide separation device.

Further, the hydrogen production system may further include a carbon dioxide recovery device for recovering finally-separated carbon dioxide.

The above objects, other objects, characteristics, and advantages of the present invention will be apparent from the following detailed description of preferred embodiments with reference to the accompanying drawings.

Advantageous Effects of Invention

In the method and device for separating hydrogen sulfide according to the present invention, the contact between the hydrogen sulfide adsorbent and the gas to be treated is made in a dry state, and therefore carbon dioxide contained in the gas to be treated does not react with the tertiary amine of the hydrogen sulfide adsorbent, but only hydrogen sulfide reacts with the tertiary amine and is adsorbed to the hydrogen sulfide adsorbent. As a result, only hydrogen sulfide is selectively adsorbed to the hydrogen sulfide adsorbent even when carbon dioxide is present at high concentration.

Further, the hydrogen production system according to the present invention includes the above-described hydrogen sulfide separation device, and therefore only hydrogen sulfide can be selectively separated so that hydrogen and carbon dioxide whose hydrogen sulfide content is very low can be obtained.

DESCRIPTION OF EMBODIMENTS

Embodiments of the present invention will be described below with reference to the accompanying drawings, but the present invention is not limited to the following description.

A hydrogen sulfide adsorbent used in the present invention can be prepared by allowing a tertiary amine to be supported by a porous material so that the gas to be treated and the hydrogen sulfide adsorbent are brought into contact with each other in a dry state. Examples of the porous material that can be used to prepare the hydrogen sulfide adsorbent include activated carbon and activated alumina. In this embodiment, activated carbon is preferably used as the porous material. As the tertiary amine, a tertiary alkanolamine is preferably used. Examples of the tertiary alkanolamine include triethanolamine, N-methyl-diethanolamine, N,N-dimethyl-monoethanolamine, triisopropanolamine, N-methyl-diisopropanolamine, and N,N-dimethyl-monoisopropanolamine. Among them, triethanolamine is preferably used. In this embodiment, triethanolamine is used as the tertiary amine. The tertiary amine can be supported by activated carbon by introducing activated carbon into an aqueous triethanolamine solution prepared to have a predetermined concentration, separating the activated carbon by filtration, and sufficiently drying the activated carbon.

A carbon dioxide adsorbent used in the present invention can be prepared by allowing an amine compound to be supported by a porous material. Examples of the porous material that can be used to prepare the carbon dioxide adsorbent include activated carbon and activated alumina. In this embodiment, activated carbon is used as the porous material. Examples of the amine compound include polyethyleneimine, monoethanolamine, diethanolamine, triethanolamine, tetraethylenepentamine, methyldiethanolamine, isopropanolamine, diisopropanolamine, dibutylamine, diethylenetriamine, triethylenetetramine, hexamethylenediamine, benzylamine, and morpholine. In this embodiment, diethanolamine is used. The amine compound can be supported by activated carbon by introducing activated carbon into an aqueous diethanolamine solution adjusted to a predetermined concentration, separating the activated carbon by filtration, and drying the activated carbon.

A carbon dioxide absorption method that can be used in the present invention is not limited to an adsorption method using the above-described carbon dioxide adsorbent, and may be either a chemical absorption method using an amine absorbing liquid or a physical absorption method using an alcohol solvent.

Figure 1:
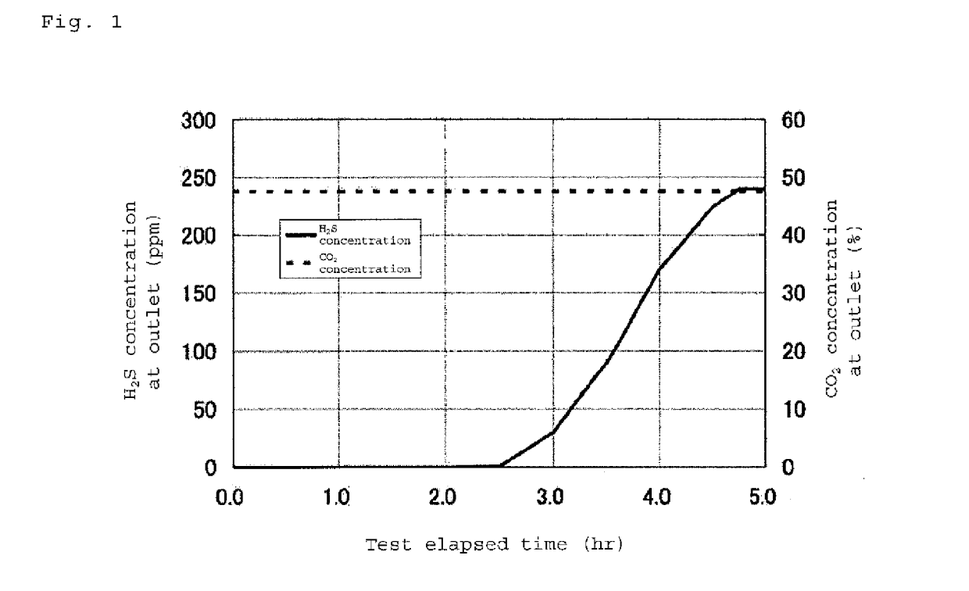
FIG. 1 is a graph showing adsorption characteristics data, which indicates that hydrogen sulfide can be selectively separated by a hydrogen sulfide separation method according to the present invention.

An experiment was performed to verify the effect of a hydrogen sulfide separation method according to the present invention, and the result of the experiment is shown in FIG. 1. In this experiment, a column having a diameter of 54.9 cm was filled with 333 g of a hydrogen sulfide adsorbent in which triethanolamine was supported by activated carbon (length of hydrogen sulfide adsorbent: 300 mm), and a gas to be treated prepared by mixing nitrogen gas with carbon dioxide (concentration: 47.6%) and hydrogen sulfide (concentration: 240 ppm) was allowed to flow through the column at ordinary temperature and ordinary pressure at a flow rate of 0.12 m/sec, and the concentrations of carbon dioxide and the concentration of hydrogen sulfide were measured at the outlet of the column. As a result, as shown in FIG. 1, the concentration of carbon dioxide was hardly changed from the start of the experiment, and therefore the measured concentration of carbon dioxide was almost the same as the above-described set concentration of carbon dioxide in the gas to be treated. On the other hand, hydrogen sulfide was not detected until about 2.5 hours after the experiment was started, and then the concentration of hydrogen sulfide was gradually increased to almost the same value as the above-described set concentration of hydrogen sulfide in the gas to be treated. This result indicates that the hydrogen sulfide adsorbent does not adsorb carbon dioxide at all, but almost completely adsorbs hydrogen sulfide until the amount of hydrogen sulfide adsorbed reaches saturation.

Figure 2:
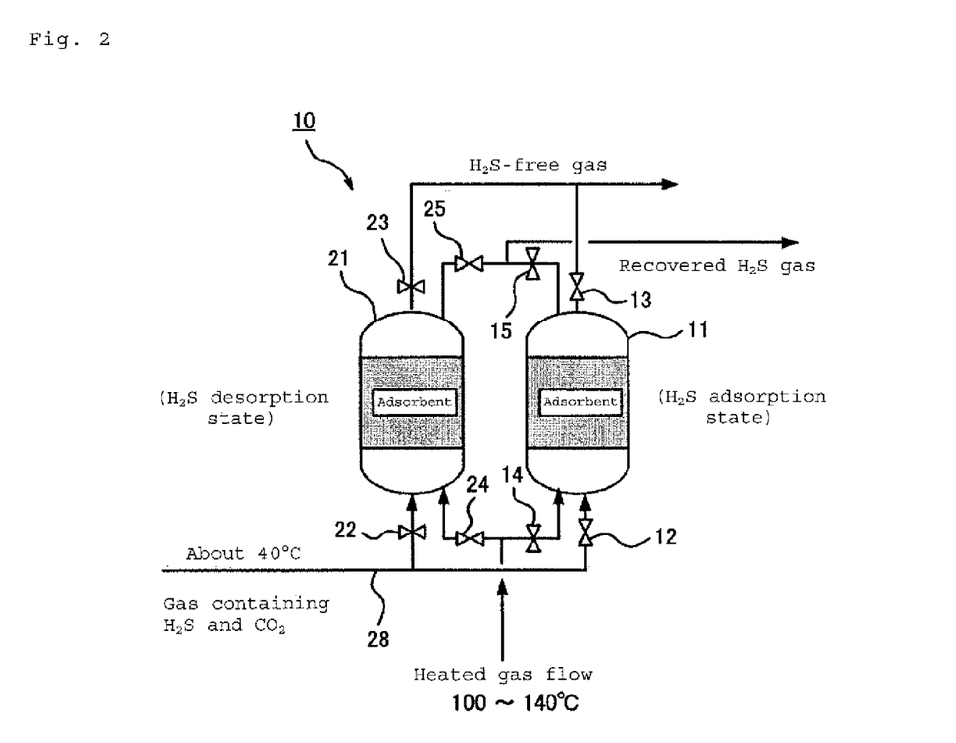
FIG. 2 is a conceptual diagram of a hydrogen sulfide separation device according to one embodiment of the present invention.

FIG. 2 shows a schematic configuration of a hydrogen sulfide separation device 10 according to an embodiment of the present invention. The hydrogen sulfide separation device 10 according to this embodiment includes two adsorbent-packed towers 11 and 21 each filled with a hydrogen sulfide adsorbent for adsorbing and desorbing hydrogen sulfide. The hydrogen sulfide adsorbent used in this embodiment is prepared by allowing triethanolamine to be supported by a porous material such as activated carbon. A gas to be treated containing carbon dioxide and hydrogen sulfide at about 40° C. is supplied to the adsorbent-packed towers 11 and 21 through a line 28. As the gas to be treated, for example, a mixed gas obtained by treating synthesis gas produced in the process of hydrogen production or hydrogen sulfide-containing carbon dioxide separated from the mixed gas is supplied.

A valve 12 is provided between the line 28 and one of the adsorbent-packed towers 11, which is opened and closed to start and stop the supply of the gas to be treated. A valve 13 is provided above the adsorbent-packed tower 11, which is used to discharge the gas to be treated after adsorption of hydrogen sulfide when adsorption of hydrogen sulfide is performed. Further, a valve 15 is provided above the adsorbent-packed tower 11, which is used to recover desorbed hydrogen sulfide when desorption of hydrogen sulfide is performed. Similarly, a valve 22 is provided between the other adsorbent-packed tower 21 and the line 28, which is used to turn on and off the supply of the gas to be treated, and a valve 23 is provided above the adsorbent-packed tower 21, which is used to discharge the gas to be treated after adsorption of hydrogen sulfide when adsorption of hydrogen sulfide is performed. Further, a valve 25 is provided above the adsorbent-packed tower 21, which is used to recover desorbed hydrogen sulfide when desorption of hydrogen sulfide is performed. Further, valves 14 and 24 are provided which are used to supply a heated gas flow to the adsorbent-packed towers 11 and 21 when desorption of hydrogen sulfide is performed.

In FIG. 2, the valves 12 and 13 provided below and above one of the adsorbent-packed towers 11 are opened and the valves 14 and 15 are closed so that adsorption of hydrogen sulfide contained in the gas to be treated is performed in the adsorbent-packed tower 11. Further, in FIG. 2, the valves 22 and 23 provided below and above the other adsorbent-packed tower are closed and the valves 24 and 25 are opened so that desorption of hydrogen sulfide is performed in the adsorbent-packed tower 21. On the other hand, when adsorption of hydrogen sulfide contained in the gas to be treated is performed in the adsorbent-packed tower 21 and desorption of hydrogen sulfide is performed in the adsorbent-packed tower 11, the valves 12 and 13 are closed, the valves 22 and 23 are opened, the valves 14 and 15 are opened, and the valves 24 and 25 are closed.

In the adsorbent-packed towers 11 and 21 in the hydrogen sulfide separation device 10 according to this embodiment, hydrogen sulfide contained in the gas to be treated is adsorbed by bringing the hydrogen sulfide adsorbent and the gas to be treated into contact with each other in a dry state. Therefore, only hydrogen sulfide contained in the gas to be treated containing carbon dioxide and hydrogen sulfide is adsorbed to the hydrogen sulfide adsorbent, and carbon dioxide is discharged from the adsorbent-packed tower without being adsorbed. Further, when adsorption of hydrogen sulfide is performed at high pressure, the amount of hydrogen sulfide adsorbed per unit weight of the hydrogen sulfide adsorbent is increased, and therefore the amount of the hydrogen sulfide adsorbent used can be reduced as compared to when adsorption of hydrogen sulfide is performed at ordinary pressure.

When desorption of hydrogen sulfide is performed in the adsorbent-packed towers 11 and 21, a heated gas flow (e.g., water vapor, a gas containing no oxygen, a mixed fluid of them, or a gas obtained by combustion of combustible off-gas after separation of hydrogen by a hydrogen purification device that will be described later) at 150° C. or lower (e.g., 100 to 140° C.) can be used. In this embodiment, the amount of energy consumed to desorb hydrogen sulfide is lower than before, and is 1.1 MJ per ton of $CO_2$ recovered. This energy consumption is about ⅔ of that of a conventional Selexol method that needs the process of selectively recovering carbon dioxide and the process of selectively recovering hydrogen sulfide.

Although the embodiment of the present invention has been described above with reference to the hydrogen sulfide separation device including the two adsorbent-packed towers 11 and 21, the present invention is not limited thereto and can be applied also to a hydrogen sulfide separation device including three or more adsorbent-packed towers. In this case, continuous separation of hydrogen sulfide can be performed by supplying the gas to be treated to one or more of the adsorbent-packed towers to perform selective adsorption of hydrogen sulfide in a dry state while the heated gas flow is supplied to one or more of the other adsorbent-packed towers to perform desorption of hydrogen sulfide.

Figure 3:
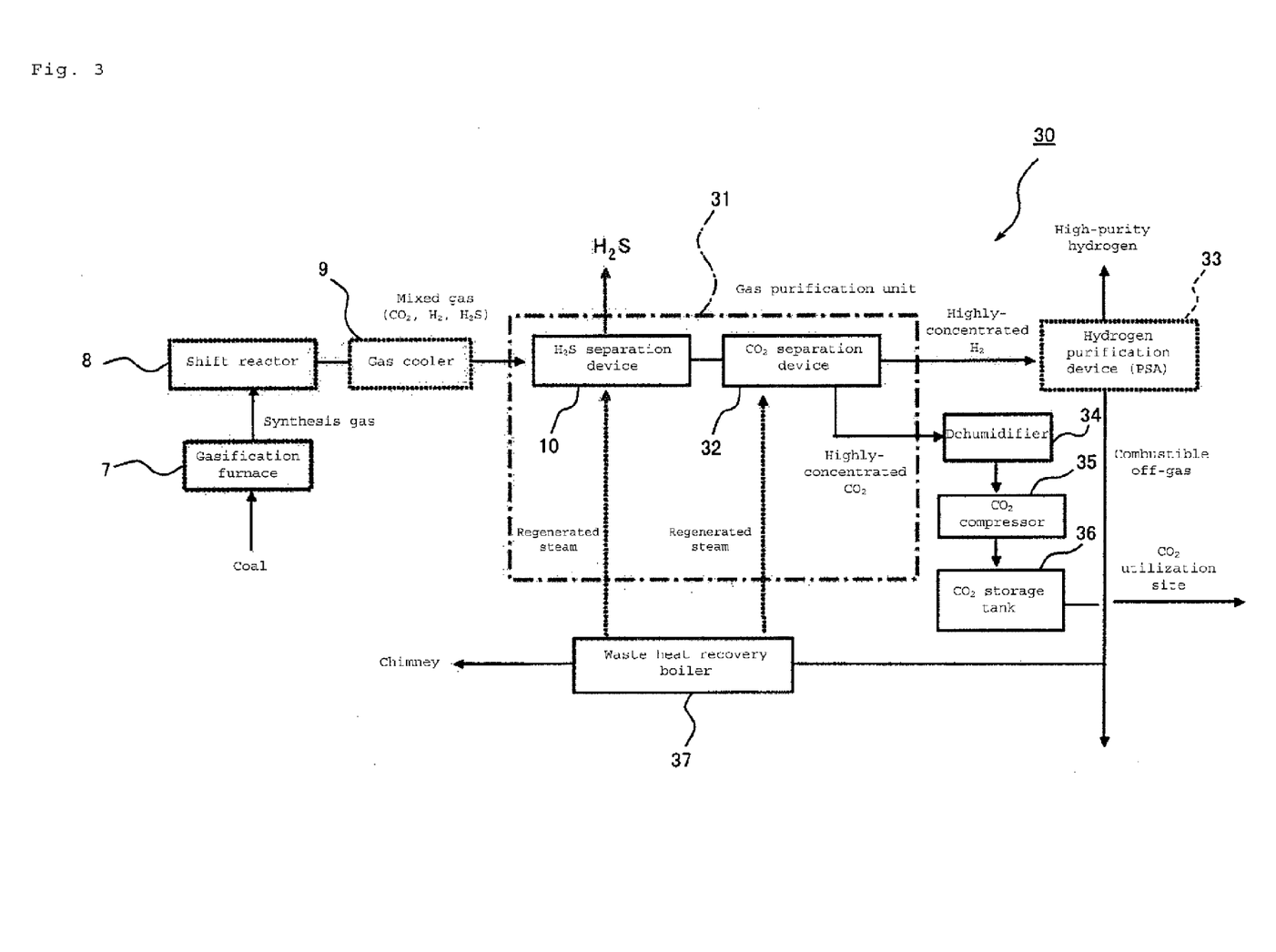
FIG. 3 is a conceptual diagram of a hydrogen production system according to one embodiment of the present invention.

FIG. 3 shows a schematic configuration of a hydrogen production system 30 according to one embodiment of the present invention. The hydrogen production system 30 according to this embodiment is a system for producing high-purity hydrogen gas from a raw material gas. More specifically, the hydrogen production system 30 is a system in which synthesis gas obtained by gasifying a fuel such as coal in a gasification furnace 7 is further reacted in a shift reactor 8 to obtain a mixed gas, the mixed gas is cooled by a gas cooler 9 to obtain a raw material gas, and highly-concentrated hydrogen is separated from the raw material gas. The raw material gas (mixed gas) contains, in addition to hydrogen, carbon dioxide, and hydrogen sulfide, a combustible gas, and most of water vapor is condensed and removed by the gas cooler 9, and therefore the raw material gas is in a state at about ordinary temperature and a high pressure of about 1.0 to 4.0 MPaA.

The hydrogen production system 30 according to this embodiment includes a gas purification unit 31 that purifies the above-described raw material gas and a hydrogen purification device 33 that separates highly-concentrated hydrogen from a gas obtained by removing hydrogen sulfide and carbon dioxide from the raw material gas by the gas purification unit 31. The gas purification unit 31 includes a hydrogen sulfide separation device 10 that separates hydrogen sulfide from the raw material gas at ordinary temperature and high pressure (1.0 to 4.0 MPaA) and a carbon dioxide separation device 32 that separates carbon dioxide from a gas after separation of hydrogen sulfide at ordinary temperature and high pressure (1.0 to 4.0 MPaA). That is, the hydrogen sulfide separation device 10 and the carbon dioxide separation device 32 are provided on a high-pressure gas treatment line.

The hydrogen production system 30 according to this embodiment further includes a dehumidifier 34 that removes moisture from carbon dioxide separated by the carbon dioxide separation device 32, a carbon dioxide compressor 35 for compressing carbon dioxide after dehumidification, and a carbon dioxide storage tank 36 that stores carbon dioxide after compression.

Further, the hydrogen production system 30 includes a waste heat recovery boiler 37 that supplies regenerated steam to the hydrogen sulfide separation device 10 and the carbon dioxide separation device 32. The steam generated by the waste heat recovery boiler 37 is used for desorption of hydrogen sulfide in the hydrogen sulfide separation device 10. Further, as will be described later, when the carbon dioxide separation device 32 is of a type using a carbon dioxide adsorbent in which an amine compound is supported by a porous material, the steam generated by the waste heat recovery boiler 37 is used also for desorption of carbon dioxide.

In this embodiment, the device shown in FIG. 2 is used as the hydrogen sulfide separation device 10 in the gas purification unit 31. As described above, the high-pressure raw material gas (mixed gas) at about 1.0 to 4.0 MPa and about ordinary temperature is supplied to the hydrogen sulfide separation device 10. In the hydrogen sulfide separation device 10 shown in FIG. 2, the mixed gas is supplied from the gas cooler 9 to any one of the adsorbent-packed towers 11 and 21 to perform adsorption of hydrogen sulfide, and the regenerated steam is supplied from the waste heat recovery boiler 37 to the other adsorbent-packed tower to perform desorption of hydrogen sulfide.

In this embodiment, adsorption of hydrogen sulfide is performed in a dry state, and therefore only hydrogen sulfide contained in the mixed gas is adsorbed to the hydrogen sulfide adsorbent and carbon dioxide as well as hydrogen and the combustible gas passes through the hydrogen sulfide adsorbent without being adsorbed. Further, in this embodiment, adsorption of hydrogen sulfide is performed at high pressure, and therefore the amount of hydrogen sulfide recovered per unit weight of the adsorbent is larger than that when adsorption of hydrogen sulfide is performed at ordinary pressure. This makes it possible to reduce the amount of the hydrogen sulfide adsorbent in the adsorbent-packed towers 11 and 21.

Then, the gas after separation of hydrogen sulfide by the hydrogen sulfide separation device 10 is transferred to the carbon dioxide separation device 32. In this embodiment, the hydrogen sulfide separation device 10 shown in FIG. 2 can be used as the carbon dioxide separation device 32 by filling the adsorbent-packed towers with a carbon dioxide adsorbent instead of the hydrogen sulfide adsorbent. In this case, as the carbon dioxide adsorbent, for example, one in which an amine compound such as monoethanolamine or diethanolamine suitable for adsorption of carbon dioxide is supported by a porous material such as activated carbon or alumina can be used.

When such a carbon dioxide separation device using the carbon dioxide adsorbent supporting the amine compound is used, the gas after separation of hydrogen sulfide is supplied from the hydrogen sulfide separation device 10 to one of the adsorbent-packed towers of the carbon dioxide separation device to perform adsorption of carbon dioxide, and the regenerated steam is supplied from the waste heat recovery boiler 37 to the other adsorbent-packed tower of the carbon dioxide separation device to perform desorption of carbon dioxide. In this embodiment, hydrogen sulfide is removed from the mixed gas by the hydrogen sulfide separation device 10 prior to the separation of carbon dioxide by the carbon dioxide separation device 32, and therefore carbon dioxide whose hydrogen sulfide content is very low can be recovered. Further, adsorption of hydrogen sulfide to the carbon dioxide adsorbent does not occur, and therefore the load on the carbon dioxide separation device 32 is reduced as compared to when separation of carbon dioxide is previously performed as in the case of a hydrogen production system 40 shown in FIG. 4 which will be described later In this embodiment, a gas after separation of carbon dioxide by the carbon dioxide separation device 32 is transferred to the hydrogen purification device 33 using a PSA method, and hydrogen is separated in the hydrogen purification device 33 so that highly-concentrated hydrogen is obtained and combustible off-gas is recovered. As the hydrogen purification device 33, a hydrogen purification device using a conventionally-known alkali absorption method or cryogenic distillation method as well as a hydrogen purification device using a PSA method can be used. As described above, the recovered combustible off-gas is combusted in the waste heat recovery boiler 37 and used as a heat source for generating steam used for desorption of hydrogen sulfide in the hydrogen sulfide separation device 10 and desorption of carbon dioxide in the carbon dioxide separation device 32.

On the other hand, carbon dioxide separated from the carbon dioxide adsorbent in the process of desorbing carbon dioxide in the carbon dioxide separation device 32 is subjected to moisture removal in the dehumidifier 34, compressed by the carbon dioxide compressor 35, and stored in the carbon dioxide storage tank 36.

In the hydrogen production system 30 according to this embodiment, the hydrogen sulfide separation device 10 that performs separation of hydrogen sulfide in a dry state using the carbon dioxide adsorbent in which the amine compound is supported by the porous material is provided upstream of the carbon dioxide separation device 32, which makes it possible to selectively separate hydrogen sulfide while preventing adsorption of carbon dioxide. As a result, carbon dioxide whose hydrogen sulfide concentration is very low can be recovered.

Figure 4:
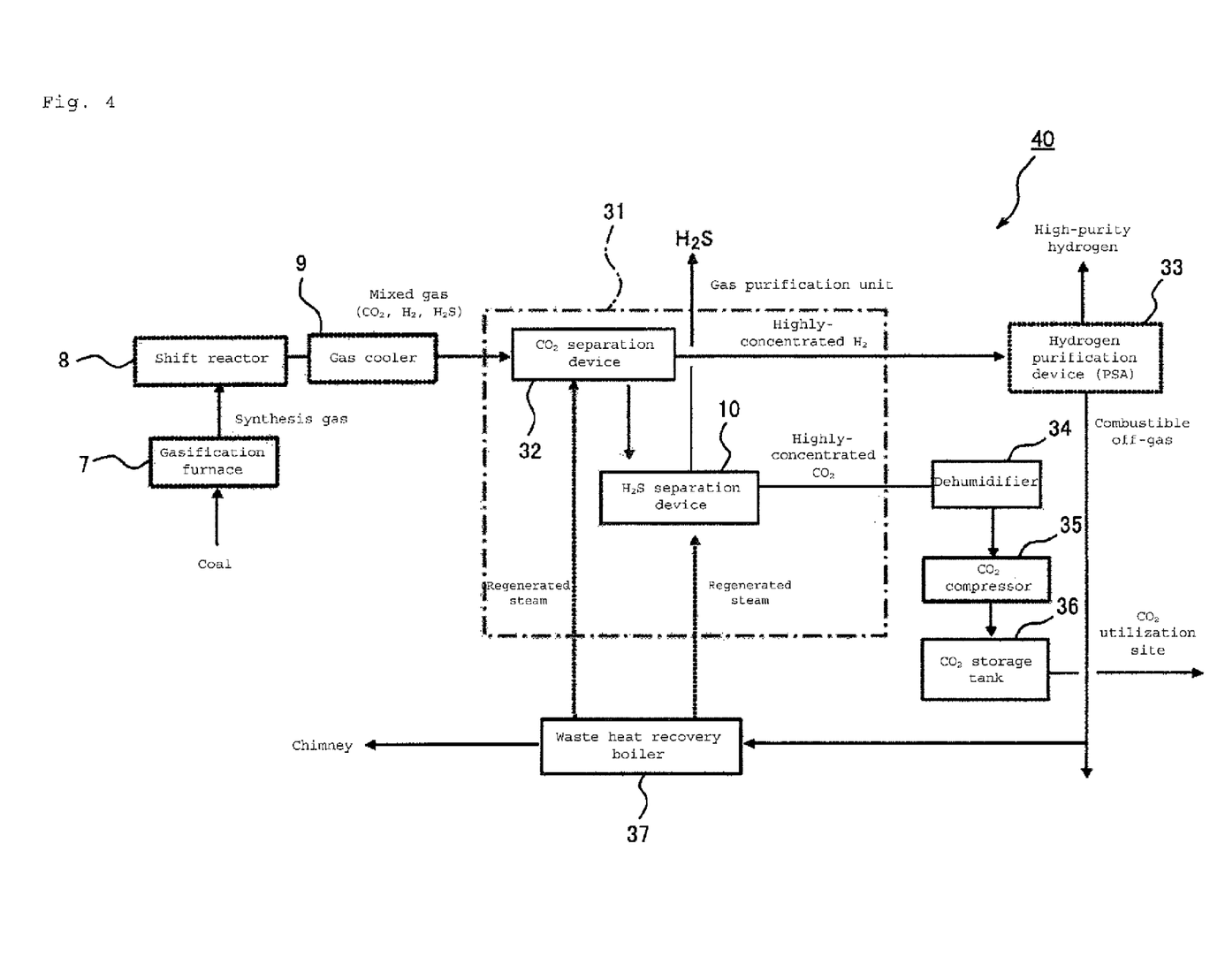
FIG. 4 is a conceptual diagram of a hydrogen production system according to another embodiment of the present invention.

FIG. 4 shows a schematic configuration of a hydrogen production system 40 according to another embodiment of the present invention. The hydrogen production system 40 according to this embodiment has the same configuration as the hydrogen production system 30 shown in FIG. 3 except that the positions of the hydrogen sulfide separation device 10 and the carbon dioxide separation device 32 in the gas purification unit 31 are different. Therefore, components shown in FIG. 4 corresponding to those shown in FIG. 3 are given the same reference signs.

In the hydrogen production system 40 according to this embodiment, a raw material gas (mixed gas) after cooling by a gas cooler 9 is first transferred to a carbon dioxide separation device 32 of a gas purification unit 31. Also in this embodiment, as the carbon dioxide separation device 32, the carbon dioxide separation device using the carbon dioxide adsorbent in which the amine compound is supported by the porous material is used. In this embodiment, the raw material gas directly supplied to the carbon dioxide separation device 32 contains both hydrogen sulfide and carbon dioxide, and therefore hydrogen sulfide as well as carbon dioxide contained in the raw material gas is adsorbed to the carbon dioxide adsorbent of the carbon dioxide separation device 32.

Further, when desorption of carbon dioxide is performed, hydrogen sulfide as well as carbon dioxide is desorbed. In this embodiment, adsorption of hydrogen sulfide and carbon dioxide is performed at ordinary temperature and high pressure (1.0 to 4.0 MPaA) as in the case of the embodiment shown in FIG. 3. That is, the carbon dioxide separation device 32 is provided on a high-pressure gas treatment line. The amount of hydrogen sulfide adsorbed increases as pressure increases, and therefore also in this embodiment, the amount of hydrogen sulfide adsorbed per unit weight of the adsorbent is larger than that when adsorption of hydrogen sulfide and carbon dioxide is performed at ordinary pressure, and the hydrogen sulfide content of a gas discharged from the carbon dioxide separation device 32 is very low.

The gas discharged from the carbon dioxide separation device 32 is transferred to a hydrogen purification device 33. In the hydrogen purification device 33, highly-concentrated hydrogen gas is separated and combustible off-gas is recovered. The recovered combustible off-gas is combusted in a waste heat recovery boiler 37 and used as a heat source for regenerating steam used for desorption of hydrogen sulfide in a hydrogen sulfide separation device 10 and desorption of carbon dioxide in the carbon dioxide separation device 32.

On the other hand, as described above, a waste gas desorbed by regeneration treatment of the carbon dioxide separation device 32 contains carbon dioxide and hydrogen sulfide, and this gas is then transferred to the hydrogen sulfide separation device 10. That is, the hydrogen sulfide separation device 10 is provided on an ordinary-pressure gas treatment line independent from the high-pressure gas treatment line. Also in this embodiment, the hydrogen sulfide separation device shown in FIG. 2 is used as the hydrogen sulfide separation device 10. Also in the hydrogen sulfide separation device 10, contact between the waste gas and the hydrogen sulfide adsorbent, in which the tertiary amine is supported by the porous material, is made in a dry state, and therefore only hydrogen sulfide is selectively adsorbed and desorbed, and carbon dioxide passes through the hydrogen sulfide adsorbent without being adsorbed. It is to be noted that in this embodiment, separation of hydrogen sulfide by the hydrogen sulfide separation device 10 is performed at ordinary temperature and ordinary pressure, and therefore the amount of the hydrogen sulfide adsorbent required to adsorb hydrogen sulfide is larger as compared to the above-described hydrogen production system 30 shown in FIG. 3.

In this embodiment, carbon dioxide passed through the hydrogen sulfide adsorbent in the hydrogen sulfide separation device 10 is subjected to moisture removal in a dehumidifier 34, compressed by a carbon dioxide compressor 35, and stored in a carbon dioxide storage tank 36 as in the case of the hydrogen production system 30 shown in FIG. 3. Further, hydrogen sulfide separated by the hydrogen sulfide separation device 10 is transferred to the outside of the hydrogen production system 40.

In the hydrogen production system 40 according to this embodiment, the hydrogen sulfide separation device 10 performs separation of hydrogen sulfide at ordinary temperature and ordinary pressure, which is advantageous in that the hydrogen sulfide separation device does not need to be designed to withstand high pressure and therefore a reduction in the cost and size of the system can be achieved.

Figure 5:
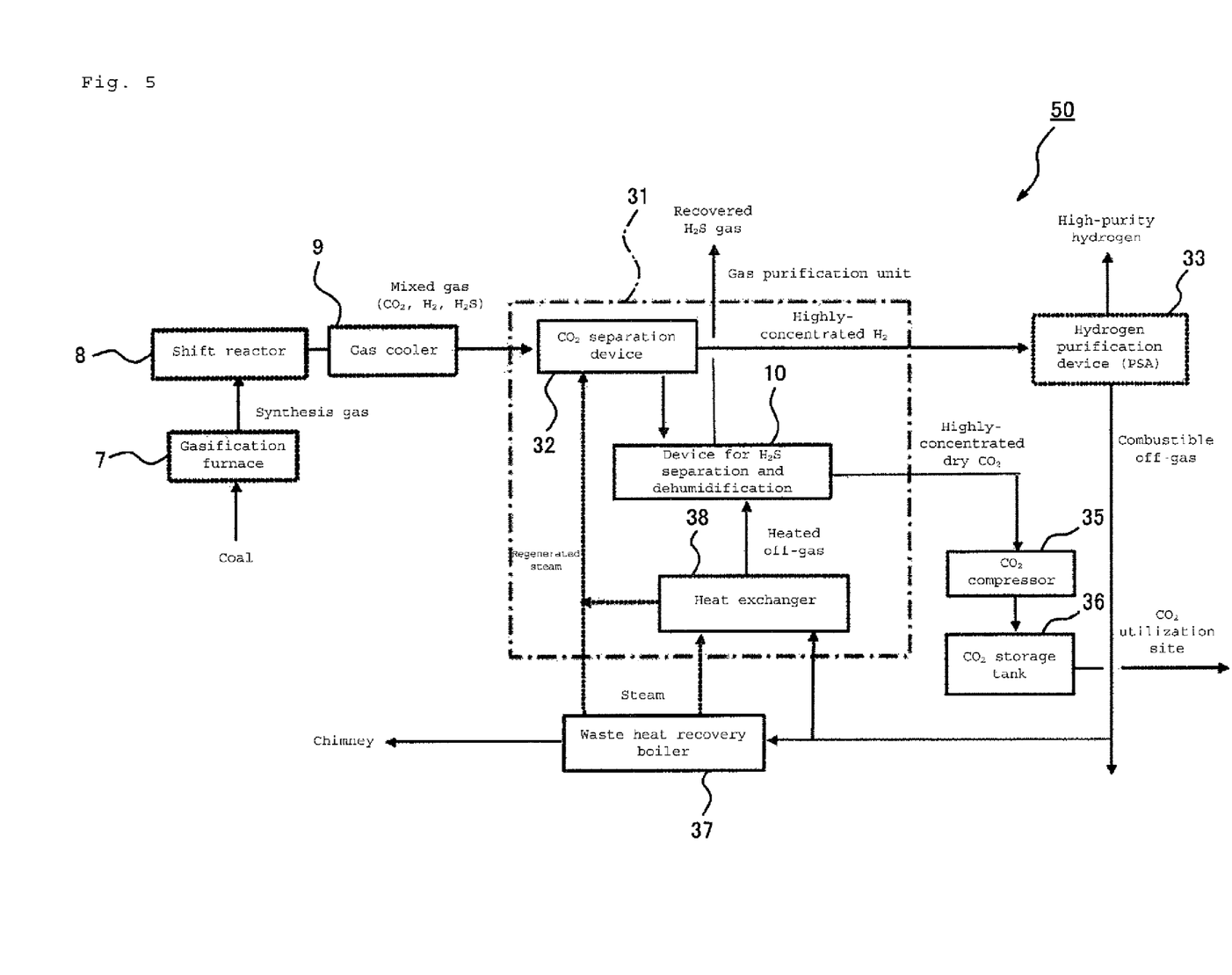
FIG. 5 is a conceptual diagram of a hydrogen production system according to yet another embodiment of the present invention.

FIG. 5 shows a schematic configuration of a hydrogen production system 50 according to yet another embodiment of the present invention. The hydrogen production system 50 according to this embodiment has the same configuration as the hydrogen production system 40 shown in FIG. 4 except that the dehumidifier 34 is not provided and that the gas purification unit 31 includes a heat exchanger 38. Therefore, components shown in FIG. 5 corresponding to those shown in FIG. 4 are given the same reference signs.

Also in the hydrogen production system 50 according to this embodiment, a raw material gas (mixed gas) after cooling by a gas cooler 9 is transferred to a carbon dioxide separation device 32 in a gas purification unit 31. As in the case of the hydrogen production system 40 shown in FIG. 4, carbon dioxide and hydrogen sulfide contained in the raw material gas are adsorbed to a carbon dioxide adsorbent in the carbon dioxide separation device 32, and a gas discharged from the carbon dioxide separation device 32 is transferred to a hydrogen purification device 33. In the hydrogen purification device 33, highly-concentrated hydrogen gas is separated from the gas discharged from the carbon dioxide separation device 32, and combustible off-gas is recovered. Carbon dioxide and hydrogen sulfide adsorbed to the carbon dioxide adsorbent in the carbon dioxide separation device 32 are desorbed from the carbon dioxide adsorbent by regenerated steam supplied from a waste heat recovery boiler 37 and are transferred to a hydrogen sulfide separation device 10.

In this embodiment, hydrogen sulfide is adsorbed to a hydrogen sulfide adsorbent in the process of adsorption by the hydrogen sulfide separation device 10 as in the case of the embodiment shown in FIG. 4, but unlike the embodiment shown in FIG. 4, desorption of hydrogen sulfide is performed using heated off-gas at 100° C. or higher obtained by heating the combustible off-gas recovered by the hydrogen purification device 33. This heated off-gas is prepared by heating the combustible off-gas, recovered by the hydrogen purification device 33, in the heat exchanger 38. In this embodiment, the heated off-gas at 100° C. or higher is used, and therefore moisture contained in the hydrogen sulfide adsorbent is discharged together with hydrogen sulfide to the outside of the hydrogen production system 50 so that carbon dioxide discharged from the hydrogen sulfide separation device 10 hardly contains moisture. For this reason, in this embodiment, the dehumidifier 34 shown in FIG. 4 is not provided, and therefore carbon dioxide discharged from the hydrogen sulfide separation device 10 is directly compressed by a carbon dioxide compressor 35 and then stored in a carbon dioxide storage tank 36.

In the hydrogen production system 50 according to this embodiment, the heated off-gas at 100° C. or higher obtained by heating the combustible off-gas discharged from the hydrogen purification device 33 is used to desorb hydrogen sulfide, which is advantageous in that the dehumidifier 34 does not need to be provided and therefore a reduction in the cost of the system can be achieved.

From the above description, many modifications and other embodiments of the present invention are apparent to those skilled in the art. Therefore, the above description should be construed as illustrative only and is for the purpose of teaching those skilled in the art the best mode for carrying out the present invention. The details of the structure and/or function of the present invention can be substantially altered without departing from the spirit thereof.

INDUSTRIAL APPLICABILITY

The method and device for separating hydrogen sulfide and the hydrogen production system using the same according to the present invention make it possible to separate hydrogen sulfide without influence of carbon dioxide, and therefore can be used in a variety of fields such as energy industry, environmental protection, CCS (Carbon dioxide Capture and Storage), and EOR (Enhanced Oil Recovery).

REFERENCE SIGNS LIST

7: Gasification furnace
8: Shift reactor
9: Gas cooler
10: Hydrogen sulfide separation device
11, 21: Adsorbent-packed tower
12, 13, 14, 15: Valve
22, 23, 24, 25: Valve
28: Line
30, 40, 50: Hydrogen production system
31: Gas purification unit
32: Carbon dioxide separation device
33: Hydrogen purification device
34: Dehumidifier
35: Carbon dioxide compressor
36: Carbon dioxide storage tank
37: Waste heat recovery boiler
38: Heat exchanger

The invention claimed is:

1. A system for producing hydrogen from a raw material gas that is a gas to be treated containing hydrogen sulfide, carbon dioxide, and hydrogen, the system comprising:
a hydrogen sulfide separation device
a carbon dioxide separation device that is provided downstream of the hydrogen sulfide separation device to separate carbon dioxide from a gas obtained by removing hydrogen sulfide from the raw material gas; and
a hydrogen purification device that is provided downstream of the carbon dioxide separation device to separate hydrogen from a gas obtained by removing hydrogen sulfide and carbon dioxide from the raw material gas:
wherein the hydrogen sulfide separation device is a device for selectively separating hydrogen sulfide from a gas to be treated containing hydrogen sulfide and carbon dioxide using a hydrogen sulfide adsorbent in which an amine compound is supported by a porous material, the device comprising:
an adsorbent-packed tower filled with the hydrogen sulfide adsorbent;
means for supplying the gas to be treated to the adsorbent-packed tower to bring the hydrogen sulfide adsorbent and the gas to be treated into contact with each other; and
means for supplying a heated gas flow for desorbing hydrogen sulfide from the hydrogen sulfide adsorbent after adsorption of hydrogen sulfide to the adsorbent-packed tower,
wherein the amine compound is a tertiary amine, and the contact between the hydrogen sulfide adsorbent and the gas to be treated in the adsorbent-packed tower is made in a dry state.

2. A system for producing hydrogen from a raw material gas that is a gas to be treated containing hydrogen sulfide, carbon dioxide, and hydrogen, the system comprising:
a hydrogen sulfide separation device
a carbon dioxide separation device that is provided downstream of the hydrogen sulfide separation device to separate carbon dioxide from a gas obtained by removing hydrogen sulfide from the raw material gas; and
a hydrogen purification device that is provided downstream of the carbon dioxide separation device to separate hydrogen from a gas obtained by removing hydrogen sulfide and carbon dioxide from the raw material gas:
wherein the hydrogen sulfide separation device is a device for selectively separating hydrogen sulfide from a gas to be treated containing hydrogen sulfide and carbon dioxide using a hydrogen sulfide adsorbent in which an amine compound is supported by a porous material, the device comprising:
a plurality of adsorbent-packed towers filled with the hydrogen sulfide adsorbent;
a plurality of means for supplying the gas to be treated to the adsorbent-packed towers, respectively, to bring the hydrogen sulfide adsorbent and the gas to be treated into contact with each other; and
a plurality of means for supplying a heated gas flow for desorbing hydrogen sulfide from the hydrogen sulfide adsorbent after adsorption of hydrogen sulfide to the adsorbent-packed towers, respectively,
wherein the amine compound is a tertiary amine, and the contact between the hydrogen sulfide adsorbent and the gas to be treated in each of the adsorbent-packed towers is made in a dry state, and
wherein the gas to be treated is supplied from the gas supplying means to one or more of the adsorbent-packed towers, respectively, to selectively adsorb hydrogen sulfide, and the heated gas flow is supplied from the heated gas flow supplying means to another of the adsorbent-packed towers or one or more of the other adsorbent-packed towers, respectively, to desorb hydrogen sulfide.

3. The hydrogen production system according to claim 1, wherein the hydrogen sulfide separation device and the carbon dioxide separation device are provided on a high-pressure gas treatment line.

4. The hydrogen production system according to claim 2, wherein the hydrogen sulfide separation device and the carbon dioxide separation device are provided on a high-pressure gas treatment line.

5. A system for producing hydrogen from a raw material gas that is a gas to be treated containing hydrogen sulfide, carbon dioxide, and hydrogen, the system comprising:
a carbon dioxide separation device that separates hydrogen sulfide and carbon dioxide from the raw material gas;
a hydrogen purification device that is provided downstream of the carbon dioxide separation device to separate hydrogen from a gas obtained by removing hydrogen sulfide and carbon dioxide from the raw material gas; and a hydrogen sulfide separation device:
wherein the hydrogen sulfide separating device is a device for selectively separating hydrogen sulfide from a gas to be treated containing hydrogen sulfide and carbon dioxide using a hydrogen sulfide adsorbent in which an amine compound is supported by a porous material, the device comprising:
an adsorbent packed tower filled with the hydrogen sulfide adsorbent;
means for supplying the gas to be treated to the adsorbent packed tower to bring the hydrogen sulfide adsorbent and the gas to be treated into contact with each other; and
means for supplying a heated gas flow for desorbing hydrogen sulfide from the hydrogen sulfide adsorbent after adsorption of hydrogen sulfide to the adsorbent-packed tower,
wherein the amine compound is a tertiary amine, and the contact between the hydrogen sulfide adsorbent and the gas to be treated in the adsorbent-packed tower is made in a dry state.

6. A system for producing hydrogen from a raw material gas that is a gas to be treated containing hydrogen sulfide, carbon dioxide, and hydrogen, the system comprising:
a carbon dioxide separation device that separates hydrogen sulfide and carbon dioxide from the raw material gas;
a hydrogen purification device that is provided downstream of the carbon dioxide separation device to separate hydrogen from a gas obtained by removing hydrogen sulfide and carbon dioxide from the raw material gas; and
a hydrogen sulfide separation device:
wherein the hydrogen sulfide separation device is a device for selectively separating hydrogen sulfide from a gas to be treated containing hydrogen sulfide and carbon dioxide using a hydrogen sulfide adsorbent in which an amine compound is supported by porous material, the device comprising:
a plurality of adsorbent-packed towers filled with the hydrogen sulfide adsorbent;
a plurality of means for supplying the gas to be treated to the adsorbent-packed towers, respectively, to bring the hydrogen sulfide adsorbent and the gas to be treated into contact with each other; and
a plurality of means for supplying a heated gas flow for desorbing hydrogen sulfide from the hydrogen sulfide adsorbent after adsorption of hydrogen sulfide to the adsorbent-packed towers, respectively,
wherein the amine compound is a tertiary amine, and the contact between the hydrogen sulfide adsorbent and the gas to be treated in each of the adsorbent-packed towers is made in a dry state, and
wherein the gas to be treated is supplied from the gas supplying means to one or more of the adsorbent-packed towers, respectively, to selectively adsorb hydrogen sulfide, and the heated gas flow is supplied from the heated gas flow supplying means to another of the adsorbent-packed towers or one or more of the other adsorbent-packed towers, respectively, to desorb hydrogen sulfide.

7. The hydrogen production system according to claim 5, wherein the carbon dioxide separation device is provided on a high-pressure gas treatment line and the hydrogen sulfide separation device is provided on an ordinary-pressure gas treatment line.

8. The hydrogen production system according to claim 6, wherein the carbon dioxide separation device is provided on a high-pressure gas treatment line and the hydrogen sulfide separation device is provided on an ordinary-pressure gas treatment line.

9. The hydrogen production system according to claim 1, wherein the carbon dioxide separation device separates carbon dioxide using a carbon dioxide adsorbent in which an amine compound is supported by a porous material.

10. The hydrogen production system according to claim 2, wherein the carbon dioxide separation device separates carbon dioxide using a carbon dioxide adsorbent in which an amine compound is supported by a porous material.

11. The hydrogen production system according to claim 1, wherein combustible off-gas after separation of hydrogen by the hydrogen purification device is used to generate a heated gas flow for desorbing hydrogen sulfide from the hydrogen sulfide adsorbent in the hydrogen sulfide separation device.

12. The hydrogen production system according to claim 2, wherein combustible off-gas after separation of hydrogen by the hydrogen purification device is used to generate a heated gas flow for desorbing hydrogen sulfide from the hydrogen sulfide adsorbent in the hydrogen sulfide separation device.

13. The hydrogen production system according to claim 9, wherein combustible off-gas after separation of hydrogen by the hydrogen purification device is used to generate a heated gas flow for desorbing carbon dioxide from the carbon dioxide adsorbent in the carbon dioxide separation device.

14. The hydrogen production system according to claim 10, wherein combustible off-gas after separation of hydrogen by the hydrogen purification device is used to generate a heated gas flow for desorbing carbon dioxide from the carbon dioxide adsorbent in the carbon dioxide separation device.

15. The hydrogen production system according to claim 7, comprising a carbon dioxide recovery device for recovering finally-separated carbon dioxide.

16. The hydrogen production system according to claim 2, comprising a carbon dioxide recovery device for recovering finally-separated carbon dioxide.

17. The hydrogen production system according to claim 1, wherein the tertiary amine is a tertiary alkanolamine.

18. The hydrogen production system according to claim 2, wherein the tertiary amine is a tertiary alkanolamine.

19. The hydrogen production system according to claim 5, wherein the tertiary amine is a tertiary alkanolamine.

20. The hydrogen production system according to claim 6, wherein the tertiary amine is a tertiary alkanolamine.

* * * * *